(12) United States Patent
Murphy et al.

(10) Patent No.: US 8,688,688 B1
(45) Date of Patent: Apr. 1, 2014

(54) AUTOMATIC DERIVATION OF SYNONYM ENTITY NAMES

(75) Inventors: Bruce Murphy, Sydney (AU); Michal Gornisiewicz, Zurich (CH)

(73) Assignee: Google Inc., Mountain View, CA (US)

(*) Notice: Subject to any disclaimer, the term of this patent is extended or adjusted under 35 U.S.C. 154(b) by 190 days.

(21) Appl. No.: 13/204,498

(22) Filed: Aug. 5, 2011

Related U.S. Application Data

(60) Provisional application No. 61/508,025, filed on Jul. 14, 2011.

(51) Int. Cl.
*G06F 17/30* (2006.01)
(52) U.S. Cl.
USPC .......................................................... 707/714
(58) Field of Classification Search
USPC ............... 707/2, 3, 714; 704/4, 10; 709/225
See application file for complete search history.

(56) References Cited

U.S. PATENT DOCUMENTS

| | | | |
|---|---|---|---|
| 5,848,373 A | 12/1998 | DeLorme et al. | |
| 5,883,986 A | 3/1999 | Kopec et al. | |
| 5,907,821 A * | 5/1999 | Kaji et al. | 704/4 |
| 6,184,823 B1 | 2/2001 | Smith et al. | |
| 6,292,771 B1 | 9/2001 | Haug et al. | |
| 7,076,505 B2 | 7/2006 | Campbell | |
| 7,082,443 B1 | 7/2006 | Ashby | |
| 7,092,926 B2 | 8/2006 | Cerrato | |
| 7,096,117 B1 | 8/2006 | Gale et al. | |
| 7,197,500 B1 | 3/2007 | Israni et al. | |
| 7,340,460 B1 | 3/2008 | Kapur et al. | |
| 7,392,278 B2 | 6/2008 | Chen et al. | |
| 7,428,533 B2 | 9/2008 | Kapur et al. | |
| 7,593,904 B1 | 9/2009 | Kirshenbaum et al. | |
| 7,599,988 B2 | 10/2009 | Frank | |
| 7,620,628 B2 | 11/2009 | Kapur et al. | |
| 8,086,591 B2 | 12/2011 | Scott et al. | |
| 8,195,653 B2 | 6/2012 | Dandekar et al. | |
| 8,201,078 B2 | 6/2012 | Boyer et al. | |
| 2003/0163375 A1 | 8/2003 | Dombrowski et al. | |
| 2003/0217052 A1 * | 11/2003 | Rubenczyk et al. | 707/3 |
| 2004/0008225 A1 | 1/2004 | Campbell | |
| 2004/0078750 A1 | 4/2004 | Frank | |
| 2004/0141354 A1 | 7/2004 | Carnahan | |
| 2004/0249637 A1 | 12/2004 | Baker | |
| 2004/0267718 A1 | 12/2004 | Milligan et al. | |

(Continued)

OTHER PUBLICATIONS

Cui, H., et al., "Probabilistic Query Expansion Using Query Logs," WWW 2002, May 7-11, 2002, Honolulu, Hawaii, USA, 8 pages.

(Continued)

*Primary Examiner* — Etienne LeRoux
(74) *Attorney, Agent, or Firm* — Fenwick & West LLP

(57) ABSTRACT

A synonym module analyzes a set of names for entities, such as names of streets and cities within a geographic database, and adds synonym names to the entities based on the analysis. More specifically, based on adjacencies of words within the names, the synonym module formulates a set of synonym rules specifying permissible ways of spelling a single word as multiple words (or vice-versa). The synonym module applies the synonym rules to the names, and if one of the rules matches a name, the synonym module adds an associated synonym name based on the name and on the rule matching the name. User queries for named entities in the database may then take into account not only the original names of the entities, but also any added synonym names.

21 Claims, 3 Drawing Sheets

(56) References Cited

U.S. PATENT DOCUMENTS

| | | | |
|---|---|---|---|
| 2005/0066050 A1 | 3/2005 | Dharamshi | |
| 2005/0182647 A1 | 8/2005 | Saenz et al. | |
| 2005/0278378 A1 | 12/2005 | Frank | |
| 2006/0122979 A1 | 6/2006 | Kapur et al. | |
| 2007/0067157 A1* | 3/2007 | Kaku et al. | 704/10 |
| 2008/0010262 A1 | 1/2008 | Frank | |
| 2008/0027985 A1 | 1/2008 | Kasperkiewicz et al. | |
| 2008/0243838 A1 | 10/2008 | Scott et al. | |
| 2008/0288314 A1 | 11/2008 | Dombrowski et al. | |
| 2008/0288338 A1 | 11/2008 | Wiseman et al. | |
| 2009/0089261 A1 | 4/2009 | Leher et al. | |
| 2009/0164428 A1 | 6/2009 | Green et al. | |
| 2009/0254512 A1 | 10/2009 | Broder et al. | |
| 2009/0281792 A1 | 11/2009 | Green et al. | |
| 2010/0151816 A1 | 6/2010 | Besehanic et al. | |
| 2010/0169026 A1 | 7/2010 | Sorenson et al. | |
| 2010/0174703 A1 | 7/2010 | Dandekar et al. | |
| 2010/0306249 A1 | 12/2010 | Hill et al. | |
| 2011/0040695 A1 | 2/2011 | Wasicek et al. | |
| 2011/0055041 A1 | 3/2011 | Shaw et al. | |
| 2011/0093467 A1 | 4/2011 | Sharp et al. | |
| 2011/0270820 A1 | 11/2011 | Agarwal | |
| 2011/0296237 A1 | 12/2011 | Mandagere et al. | |
| 2012/0016663 A1 | 1/2012 | Gillam et al. | |
| 2013/0007256 A1 | 1/2013 | Prieditis | |
| 2013/0031033 A1 | 1/2013 | Prieditis | |

OTHER PUBLICATIONS

Office Action for U.S. Appl. No. 12/984,484, Jan. 7, 2013, 11 Pages.

Gan, Q., et al., "Analysis of Geographic Queries in a Search Engine Log," LocWeb, Apr. 22, 2008, pp. 49-56, Beijing, China.

* cited by examiner

AUTOMATIC DERIVATION OF SYNONYM ENTITY NAMES

CROSS REFERENCE TO RELATED APPLICATIONS

The application claims the benefit of Provisional Application No. 61/508,025, filed on Jul. 14, 2011, which is incorporated herein by reference.

FIELD OF ART

The present invention generally relates to the field of data processing, and more specifically, to methods of adding alternative spellings of entities in a database, such as geographic locations within a geographic information and mapping system.

BACKGROUND OF THE INVENTION

Users of online systems frequently enter queries that include names of entities of interest. For example, users of geographic information and mapping systems enter queries for locations of interest. The queries may include names such as street names, city names, state names, and the like, which reference geographic entities stored within a geographic database of the system. In many instances, a particular portion of the query could plausibly be spelled both as a single word ("compounded form") and as multiple words ("decompounded form"), where only one of these is correct for a given name. For these types of words users often use the incorrect form when spelling the query. For example, a particular street might actually have an original name "Green Wood Street" within the geographic database but could very plausibly also be spelled "Greenwood Street." However, a user entering a query with the spelling "Greenwood Street" would not be presented with the geographic entity for that particular street within the query results, since the compounded form of the name in the query ("Greenwood Street") does not literally match the decompounded form of the name in the geographic database ("Green Wood Street"). Thus, in these situations users would frequently fail to be provided with the information that they were seeking.

SUMMARY

In one embodiment, a computer-implemented method comprises identifying a first geographic entity in a geographic database having an original name that includes a plurality of terms, and forming a name synonym rule by associating a sequence of adjacent terms in the original name of the first geographic entity with a single-word concatenation of the sequence of adjacent terms. The method further comprises validating the name synonym rule by matching the single-word concatenation with a word in a dictionary and using the single-word concatenation as a synonym for the original name of the first geographic entity.

In one embodiment, a computer-readable storage medium has executable computer program instructions embodied therein that when executed by a computer processor perform actions comprising identifying a first geographic entity in a geographic database having an original name that includes a plurality of terms, and forming a name synonym rule by associating a sequence of adjacent terms in the original name of the first geographic entity with a single-word concatenation of the sequence of adjacent terms. The actions additionally comprise validating the name synonym rule by matching the single-word concatenation with a word in a dictionary, and using the single-word concatenation as a synonym for the original name of the first geographic entity.

In one embodiment, a computer system comprises a computer processor and a computer-readable medium storing a computer program executable by the computer processor and performing actions comprising identifying a first geographic entity in a geographic database having an original name that includes a plurality of terms, and forming a name synonym rule by associating a sequence of adjacent terms in the original name of the first geographic entity with a single-word concatenation of the sequence of adjacent terms. The actions further comprise validating the name synonym rule by matching the single-word concatenation with a word in a dictionary, and using the single-word concatenation as a synonym for the original name of the first geographic entity.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Architecture

Figure 1:
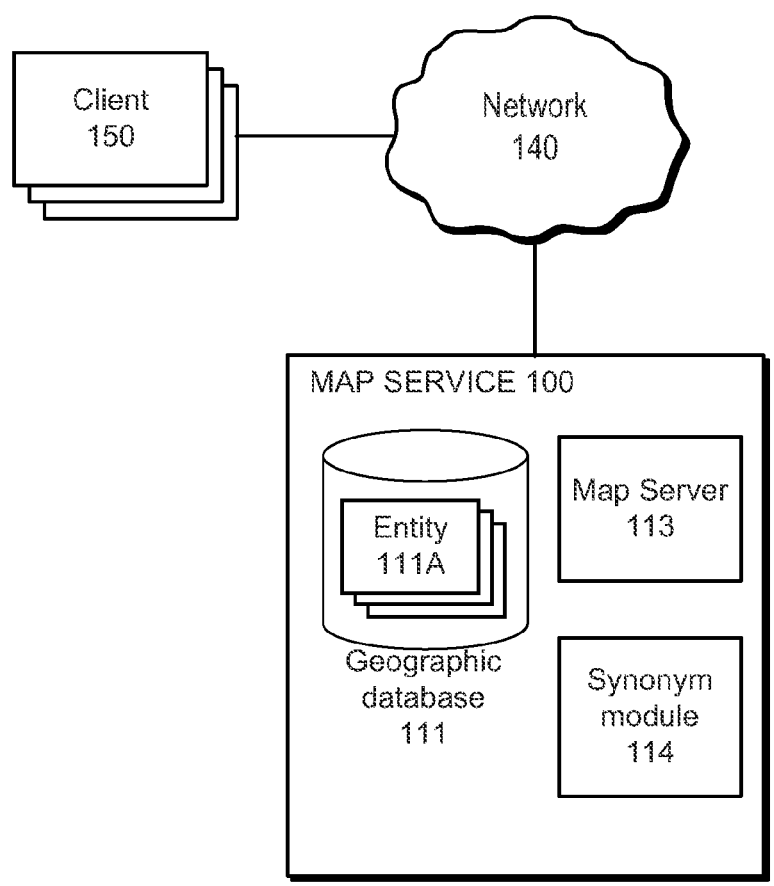
FIG. 1 is a block diagram of a system in which entity name augmentation can be performed, according to one embodiment.

FIG. 1 is a block diagram of a system in which entity name augmentation can be performed, according to one embodiment. The name augmentation provided by various embodiments can be performed for name data in many different domains. However, for purposes of example, FIG. 1 sets forth a specific example in the domain of geographical data employed by a geographical information and mapping system. Other example domains include video sharing systems (e.g., searching for videos by name), databases (e.g., searching by name for products or technical concepts listed in the database), and the like. In FIG. 1, a map service 100 represents a system such as that of GOOGLE MAPS that stores and provides map data to clients such as client devices 150 over a network 140.

The client devices 150 are computing devices that execute client software, e.g., a web browser or built-in client application, to connect to the map server 113 of the map service 100 via a network 140 and to display map data. The client device 150 might be, for example, a personal computer, a personal digital assistant, a cellular, mobile, or smart phone, or a laptop computer.

The network 140 represents the communication pathways between the client devices 150 and the map service 100. In one embodiment, the network 140 uses standard Internet communications technologies and/or protocols. Thus, the network 140 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The map service 100 includes a geographic database 111 that stores data for entities in the geographic domain, such as entities like countries, cities, streets, and the like. Entities are described in further detail below.

The map service 100 further includes a map server 113 that receives geographic queries from the clients 150 and in response provides appropriate data from the geographic database. A geographic query can be in the form of an entity name (e.g., "Eiffel Tower" or "Los Angeles"), a complete or partial address (e.g., "1600 Pennsylvania Avenue" or "1600 Pennsylvania Avenue, Washington D.C., United States"), or a free text (e.g., "lake near Chicago"), or other queries for which the relevant information is geographic in nature.

The map service 100 additionally includes a synonym module 114 that analyzes the entity data in the geographic database 111 and augments the original names of the entities within the database with additional synonym names in decompounded and/or compounded forms that are different from the original entity names. This allows a user that is incorrectly searching for a synonym name of a given geographic entity to nonetheless find the entity corresponding to the original entity name. (For example, assume that a sample entity of type STREET were located in the city of London within the United Kingdom and had the original name "Green Wood Street" and the derived synonym name "Greenwood Street". The result set for a user query for "Greenwood Street, London, UK" would include the sample entity based on a match on the synonym name, but if synonym name matching were not employed, the sample entity would be excluded from the result set since the original name would not match the query.) Moreover, for any query that includes an entity name, whether an original entity name or a synonymous entity name, the query can be expanded to include the original and synonymous entity names. In another embodiment, the synonym module 114 is not part of the map service 100 itself, but instead is located remotely from the map service 100 and accesses data such as the geographic database 111 via the network 140, reading and updating the database. Alternatively, the synonym module 114 may expose an application programming interface (API) by which a service, such as the map service 100 or any other service can provide a query name, and receive the corresponding synonym names.

The geographic database 111 stores data on geographic entities 111A such as streets, cities, states, and countries, along with geographic features, such as bodies of water, parks, mountains, forests, deserts, and so forth.

Each entity 111A corresponds to a particular geographic region, such as that of a particular country, city, street, landmark, or the like; the geographic region may be specified (for example) by a geometric shape such as a polygon that describes the boundary of the region. Additionally, each entity 111A is associated with one or more original entity names. The original entity names represent authentic spellings of the entity, e.g., as recognized in official government records. The original names are known a priori rather than being derived from other data, and hence they can be associated with the entities at the time of initial creation of the entity data. The original entity name can be its official name such as "New York City", as well as shortened versions thereof, such as "New York" as well as other informal names, such as "Big Apple" for New York, or "Tail of the Dragon" for a very twisty 11 mile section of US 129 near Deals Gap, Tenn. The original entity names for one sample subset of the database 111 might include "Mountain View" for a city entity, and "California" for a state entity, and the names may include one or more abbreviations (e.g., "CA" and "Calif.", as well as "California"). The names may also include multiple variants, each of which can be in a different natural language (e.g., the French "Californie" and the German "Kalifornien", as well as the English "California") and be associated with a language identifier to indicate the natural language that it represents, although this is not depicted in the sample subset. The names of one entity may be the same as the names of other entities, such as the abbreviation "CA" for both a state (e.g., "California") and a country (e.g., Canada).

In addition to the original entity names, each entity 111A may optionally be associated with one or more synonym names. The synonym names represent alternative spellings of the entity that a user might enter when specifying a query, for example. For example, if a particular entity had an original name "Green Wood Street," the entity might also have a synonym name "Greenwood Street," indicating that although "Green Wood Street" is the original, actual (English) spelling of the name of that particular street, "Greenwood Street" is a very plausible compounded equivalent for which a user might very likely search. The synonym names are added to entities 111A by the synonym addition module 114, as described in more detail below with respect to FIG. 2.

Additionally, each geographic entity 111A may have a corresponding type, such as STATE, CITY, or the like. The types may be ordered and assigned ranks based on their levels of specificity or typical geographic scope, such as 5 for STREET (most specific, lowest typical geographic scope), 4 for CITY, 3 for STATE, 2 for COUNTRY, and 1 for CONTINENT.

For example, Table 1, below, represents a sample subset of the information in the geographic database 111, according to one embodiment. The information includes entity name and type information, a description of the particular region that the entity represents (e.g., a descriptor of a geometric shape bounding the region), and whether the name is an original name, as opposed to a synonym name. The sample subset in the below table indicates that there is a street located in London, United Kingdom with the original name "Green Wood Street" (a decompounded spelling form) and the synonym name "Greenwood Street" (a compounded spelling form), and another, different street located in Oxford, United Kingdom with the original name "Greenwood Street" (a compounded spelling), and the synonym name "Green Wood Street" (a decompounded spelling).

TABLE 1

| NAME | TYPE | REGION | ORIGINAL NAME? |
|------|------|--------|----------------|
| North America | CONTINENT | <North America> | Y |
| Europe | CONTINENT | <Europe> | Y |
| United States | COUNTRY | <United States→North America> | Y |
| United Kingdom | COUNTRY | <United Kingdom→Europe> | Y |
| California | STATE | <California→United States→North America> | Y |
| Mountain View | CITY | <Mountain View→California→United States→North America> | Y |
| London | CITY | <London→United Kingdom→Europe> | Y |
| Oxford | CITY | <Oxford→United Kingdom→Europe> | Y |
| Green Wood Street | STREET | <Green Wood Street→London→UK> | Y |
| Greenwood Street | STREET | <Green Wood Street→London→UK> | N |
| Greenwood Street | STREET | <Greenwood Street→Oxford→UK> | Y |
| Green Wood Street | STREET | <Green Wood Street->Oxford->UK> | N |

In practice, there would be a large number of entities 111A, such as thousands of cities and millions of entities such as streets and geographic features. The various types of information may be represented differently in practice, as would be known to one of ordinary skill in the art. For example, the entity type could be represented using an integer code, and a Boolean flag could be used to represent whether the name is original. Likewise, original and synonym names could be specified as separate fields within a single record for a given entity, rather than each original or synonym name having its own record.

The data in the geographic database 111 may be created from a variety of sources, such as feeds from various governmental or private geographic databases, or manual creation and/or editing by employees of the organization responsible for the map service 100 or by users of the client devices 150.

The illustrated components of the map service 100 can be implemented as single or multiple components of software or hardware. In general, functions described in one embodiment as being performed by one component can also be performed by other components in other embodiments, or by a combination of components. Furthermore, functions described in one embodiment as being performed by components of the map service 100 can also be performed by one or more clients 150 in other embodiments if appropriate.

Figure 2:
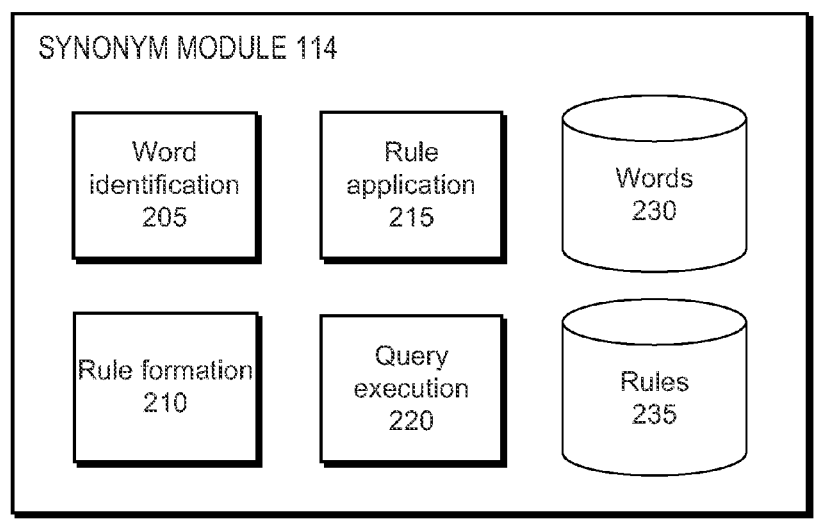
FIG. 2 is a block diagram illustrating the components of the synonym addition module of FIG. 1, according to one embodiment.

FIG. 2 is a block diagram illustrating the components of the synonym module 114 of FIG. 1, according to one embodiment. The synonym module 114 analyzes the data in the geographic database 111 and based on the analysis adds synonym names to various ones of the entities 111A in the geographic database. The synonym names can then be matched in response to a user query. This allows users to find a given entity in the database 111 having a given original name, even when the user incorrectly searches for the entity with a query that contains an incorrect compounding or decompounding of the original name.

The synonym module 114 includes a word identification module 205 for identifying all individual words 230 that are candidates for entity names, a rule formation module 210 for creating a set of name synonym rules 235, and a rule application module 215 that applies the created rules 235 to the various entities 111A to create and add synonym names for the entities in database 111, as well as a query execution module 220 that takes synonym names into account when executing a query.

The word identification module 205 identifies the set of all individual words that are candidate names in a dictionary of candidate names, and is one means for performing this function. Other means include commercial electronic dictionaries and words obtained from a corpus of documents such as a corpus of web documents. In one embodiment, the word identification module 205 more specifically identifies all words occurring at least once within the original names of all entities 111A, or some subset of entities 111A, listed in the geographic database 111. That is, the word identification module 205 iterates across all entities of interest, adding the individual words of each original name to form a set of unique words 230. (The phrase "set of unique words" means that each word in the set is unique—not that each of the words occurs only once within the original names of the entities 111A.) Typically, individual words are those tokens in the original names of entities 111A that are separated by white spaces and punctuation, but other types of delimiters may be used as well, depending on the application domain. For example, in one embodiment in addition to being delimited by one or more spaces the words may also be delimited by other non-alphanumeric characters, such as hyphens. Thus, for example, for the name "Running-water Street", the word identification module 205—as well as the other modules 210, 215 that parse individual words out of name strings—might identify three distinct words ("Running", "water", and "Street"), or two distinct words ("Running-water" and "Street"), depending on the desired treatment of hyphens. In one embodiment, the rules used to parse words may vary based on the language and locale of the names.

In one embodiment, rather than examining all entities 111A when collecting the set of all individual words 230, the word identification module 205 only examines entities with given types previously determined to be useful for this purpose, such as streets or cities, but not states or countries.

The rule formation module 210 creates the set of name synonym rules 235 by examining the original names of entities 111A, and is one means for performing this function. In one embodiment, the rule formation module 210 first identifies candidate name synonym rules by forming sequences of N ordered adjacent words within the original names of each of the various entities 111A, for some integer N (e.g., 2). (In one embodiment, the operations are case-insensitive, and thus all names are preliminarily converted to lower-case, for example.) The sequences of adjacent words represent those that a user might potentially enter as a single, compounded word. The rule formation module 210 then creates a corresponding concatenated version for each sequence. Concatenation of a sequence of words comprises placing the characters of each word together in an ordered sequence, with no delimiting characters between the words. For example, for the entity "Green Wood Street" listed in Table 1, the ordered two-word sequences {"green", "wood"} and {"wood", "street"} can be created. From the {"green", "wood"} sequence, the concatenated version "greenwood" can be formed, while from the {"wood", "street"} sequence, the concatenated version "woodstreet" can be formed.

The rule formation module 210 then creates a candidate compounding rule that associates the sequences with their corresponding single-word concatenations. A compounding rule can be represented in the form of {"x", "y"→"xy"}. The compounding rules can then be inverted to form corresponding decompounding rules in the form {"xy"→"x y"}. For example, a decompounding rule for the preceding example would be {"greenwood"→"green wood"}, indicating that the single word "greenwood" could alternatively be spelled as the two words "green wood". In one embodiment, decompounding rules are formed only from candidate compounding rules that have been validated, as further explained below. The rule formation module 210 can form compounding rules, decompounding rules, or both, in different embodiments. Each rule has an original portion on the left-hand side, representing the original word or words, and a synonym portion on the right-hand side, representing the discovered synonym word or words that can be substituted for the original portion in an original name to form a synonym name.

To validate the candidate compounding rules (i.e., to obtain only the candidate rules that are likely to be valid substitutes for one another), the rule formation module 210 checks the single, concatenated word in each candidate compounding rule against the set of words in a dictionary, which may be the dictionary of words 230 identified by the word identification module 205. If the single word is found within the set of words 230, then the corresponding compounding rule is validated and retained in the set of rules 235. If it is not, the candidate compounding rule is discarded from the set of rules. For example, the candidate compounding rule "green wood"→"greenwood" is a valid compounding rule since the term "greenwood" appears in the list of names in Table 1 (and would therefore appear in the derived word list 230 as explained above). By contrast, the candidate compounding rule "wood street"→"woodstreet" is not a valid compounding rule since the term "woodstreet" does not appear in the list of names in Table 1.

Once a candidate compounding rule has been validated, a corresponding decompounding rule can be obtained by inverting it. For example, inversion of the validated compounding rule "green wood→greenwood," yields the decompounding rule "greenwood→green wood."

In one embodiment, the check performed by the rule formation module 210 is not whether the single word is found at all within the set of words 230, but rather whether it is found at least some threshold number of times. In this embodiment, each word in the set of words 230 also has an associated count of the number of times that it occurred over all the original names.

The rule application module 215 applies the created rules 235 to the various entities 111A to add synonym names, and is one means for performing this function. Specifically, the rule application module 215 iterates over all, or some subset of, the entities 111A, determining whether the original name of an entity matches the (left-hand side) portion of the rule. If it does, in one embodiment the rule application module 215 uses the rule to add a synonym name for the entity 111A to the database 111. For example, for an entity with the original name "Greenwood Street", rule application module 215 would use the decompounding rule {"Greenwood"→"Green Wood"}, to add the synonym "Green Wood Street" for the name of the entity to database 111. Similarly, for an entity with the original name "Green Wood Street", rule application module 215 would use the compounding rule {"Green Wood"→"Greenwood"} to add the synonym "Greenwood Street" for the name of entity to database 111. The rule application module 215 may add the synonym in such a way that it can be distinguished from the original names, such as associating a flag to the synonym name, or storing it in a list of synonym names separate from the original names, for example.

In another embodiment, the rule application module 215 does not add synonyms to the names of entities 111A in the geographic database 111 itself, but rather adds them to an index for use with queries. For example, if an index generated from the geographic database 111 indicated that the query word "Greenwood" matches some set of entities 111A, then applying the rule {"Greenwood"→"Green Wood"} would modify the index to indicate that the query words "Green Wood" also match that same set of entities, though perhaps with a lower match strength due to the fact that the match is only based on a synonym. For generality, the phrase "associating a synonym name with a geographic entity" as used herein includes both direct addition of a synonym name to a name list of an entity 111A within the geographic database 111, and addition or modification of an entry in a query index to reflect the synonym name, as well as other similar techniques achieving the same effect.

The query execution module 220 identifies entities matching a given query by searching not only original entity names, but also synonym names, and is one means for performing this function. That is, in addition to searching the original names of the entities 111A for a match to query terms, the query execution module 220 also searches the synonym names added (either directly to the database 111, or to a query index) by the rule application module 215. In one embodiment, query matches to synonym names, as opposed to original names, are penalized to some degree relative to query matches to original names—i.e., query matches to synonym names receive lower match scores—to reflect the fact that they are not based on the true, original names.

In one embodiment, the various actions of the synonym module 114 are performed within names of a single natural language, rather than across all names regardless of the language. For example, the word identification module would separately identify the words 230 for English, for French, for Chinese, and the like. Likewise, the rule formation module 210 would form candidate rules for those same natural languages separately (e.g., English candidate rules based only on the English original names) and would validate the candidate rules using the words 230 for the corresponding language. Likewise, the rule application module 215 would apply rules 235 for a given natural language only to names in the same language.

In one embodiment, a separate list of words, instead of the words 230, is used to validate the rules 235 derived by the rule formation module 210. For example, the synonym module 114 could access a separate list of words derived from the web or obtained from a dictionary, and purge a rule from the candidate rules 235 if the compound word used in the rule is not found in the separate list of words. For example, a candidate rule {"greenwood"→"green wood"} in the rules 235 could be removed if a separate list of web-derived words or words obtained from a dictionary did not include the words "greenwood", "green", and "wood".

In one embodiment, the operations described above are implemented using parallel processing, e.g., via techniques such as map-reduce, which partitions the input (i.e., the different entities 111A) into smaller sets and distributes them to different computational units during a "map" step, and reassembles them using a "reduce" step.

An example of the operations of the components of FIG. 2 is now provided for an example set of entities comprising a country with an original name "United Kingdom", two sub-entities for cities with original names "London" and "Oxford", and two street entities with original names "Green Wood Street" and "Greenwood Street", the former being located within London and the latter within Oxford. Although only one original name is listed for each entity in the example, in practice each could have any number of names.

The word identification module 205 iterates across each original name of each of the entities in the example, forming the set of unique name words 230 consisting of the words {"united", "kingdom", "london", "oxford", "green", "wood", "street", and "greenwood"}.

The rule formation module 210 forms ordered pairs of adjacent words in the various original names. Thus, the name pairs from the above example set of entities are "United Kingdom", "Green Wood", "Wood Street", and "Greenwood Street". The rule formation module 210 forms candidate compounding rules by associating the ordered pairs with their compounded single-word versions. Thus, the candidate compounding rules would be:
  {"united kingdom"→"unitedkingdom"},
  {"green wood"→"greenwood"},
  {"wood street"→"woodstreet"}, and
  {"greenwood street"→"greenwoodstreet"}.
These rules could then be inverted to obtain the following candidate decompounding rules:
  {"unitedkingdom"→"united kingdom"},
  {"greenwood"→"green wood"},
  {"woodstreet→"wood street"}, and
  "greenwoodstreet"→"greenwood street".

The rule formation module 210 would then retain as the rules 235 only those candidate rules in which the single-word portion is found within the unique name words 230. Specifically, the rule formation module 210 would retain only the decompounding rule {"greenwood"→"green wood"} and the related compounding rule {"green wood"→"greenwood, since the single word "greenwood" is found within the set of unique name words 230, but the single words "unitedkingdom", "woodstreet", and "greenwoodstreet" are not.

The rule application module 215 would then apply the decompounding rule {"greenwood"→"green wood"} to any matching original names of the entities—i.e., to any names having the word "greenwood"—to form synonyms for those original names. For example, since the entity with the original name "Greenwood Street" contains (case-insensitive) the word "greenwood", the rule application module 215 assigns to the entity the synonym name "Green Wood Street", which it obtained by substituting the pair of words "Green Wood" for the single word "Greenwood." Similarly, the rule application module 215 would apply the compounding rule {"green wood"→"greenwood"} to assign to the entity with the original name "Green Wood Street" the synonym name "Greenwood Street". This process is repeated until al the rules have been processed and all corresponding synonym names added to the appropriate entities 111A. The resulting synonym names are then available to be matched by queries.

As an example of the use of synonym names for matching queries, assume that the geographic database 111 includes an entity of type STREET located in London, United Kingdom and having the original name "Green Wood Street" and the derived synonym name "Greenwood Street," and that the geographic database does not include any entity located in London, United Kingdom having the original name "Greenwood Street." In response to a query for a (non-existent) entity "Greenwood Street, London, UK", for example, the query module 220 could identify the entity with original name "Green Wood Street" and synonym name "Greenwood Street." If the geographic database 111 additionally included an entity located in London, United Kingdom having the original name "Greenwood Street", then in response to the query for "Greenwood Street, London, UK", the query module 220 could identify both the entity with original name "Green Wood Street" and synonym name "Greenwood Street" and the entity with the actual original name "Greenwood Street." In this case, the former entity could be penalized to rank lower than the latter entity, due to the fact that the match is based on a synonym name, rather than an original name, and thus is presumably somewhat less likely to be what the user intended.

Figure 3:
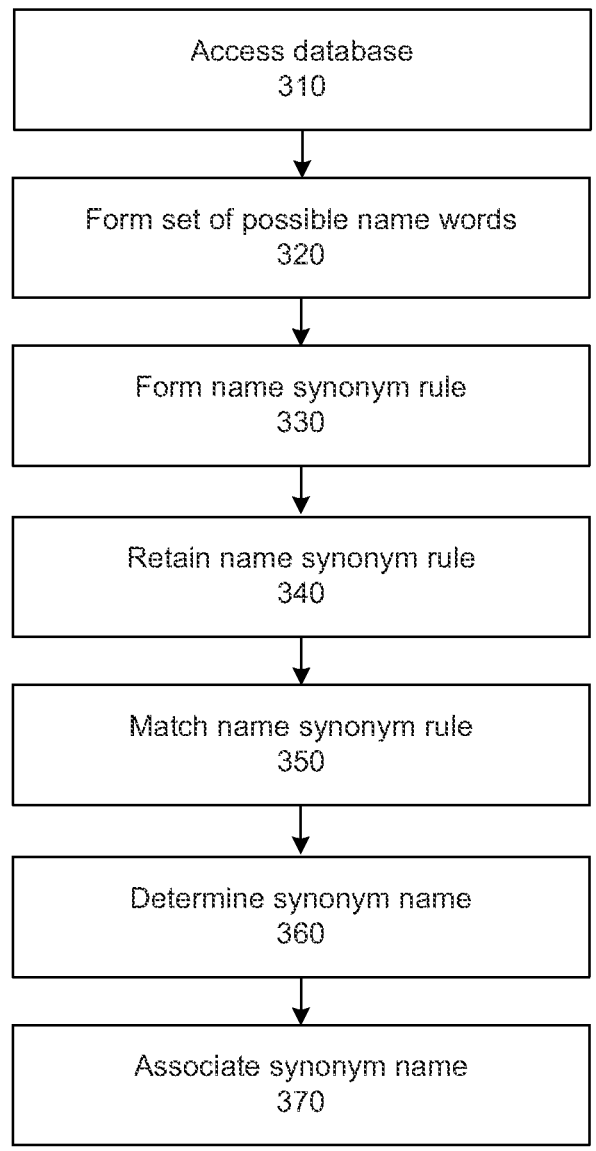
FIG. 3 is a flowchart illustrating the actions involved in adding a synonym name to a geographic entity, according to one embodiment.

FIG. 3 is a flowchart illustrating the actions involved in adding a synonym name to a geographic entity, according to one embodiment. In step 310, the synonym module 114 accesses the geographic database 111. The geographic database 111 may be stored on the same system implementing the map server 100, as depicted in FIG. 1, or it may be stored remotely and its data accessed over the network 140, for example.

In step 320, the synonym module 114 forms a set of possible name words based on original names of entities stored in the geographic database, as described above with respect to the word identification module 205.

In step 330, the synonym module 114 forms one or more candidate synonym rules that associate sequences of adjacent words in the original names of entities in the geographic database 111 with corresponding single-word concatenations of the sequences of adjacent words. In step 340, the synonym module retains those candidate synonym rules for which the single-word concatenations are found within the set of possible name words. These actions are described in more detail above with respect to the rule formation module 210.

In step 350, the synonym module 114 matches the names in the retained synonym rules against original names of the geographic entities. For example, a decompounding synonym rule matches an original name of an entity if the original name is a single compound word that can be decompounded according to the decompounding synonym rule. In step 360, the synonym module 114 determines synonym names based on the original name of the geographic entity and on the synonym rule. For example, for a decompounding synonym rule, the synonym module 114 substitutes, for the single compound word of the original name, the synonym name that consists of the sequence of adjacent words in the decompounding rule. In step 370, the synonym module 114 adds the synonym name to the entity having the matching original name, either directly by modifying the geographic database 111, or indirectly by modifying entry values in a query index based on the geographic database. These actions are described in more detail above with respect to the rule application module 215 of FIG. 3.

It is appreciated that although the embodiments have been described as relating to a geographic information and query system, specifically, the techniques illustrated above are equally applicable to other types of systems having a set of individual entities representing distinct concepts, each having a set of names. For example, the above-described techniques could likewise be employed as part of a video sharing service, where the entities are videos and the entity names are textual metadata such as video titles. Other domains of application would be readily appreciated by one of skill in the art.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for execution by a computer processor, the method comprising:
    identifying a first geographic entity in a geographic database having an original name that includes a plurality of terms;
    forming, by the computer processor, a name synonym rule by associating a sequence of adjacent terms in the original name of the first geographic entity with a single-word concatenation of the sequence of adjacent terms;
    validating the name synonym rule by matching the single-word concatenation with a word in a dictionary;
    using the single-word concatenation as a synonym name for the first geographic entity;
    receiving a geographic query comprising a name;
    determining that the name is the synonym name for the first geographic entity and that the name is an original name for a second geographic entity in the geographic database; and
    providing a result set comprising the first geographic entity and the second geographic entity, wherein the second geographic entity is ranked higher than the first geographic entity.

2. The computer-implemented method of claim 1, wherein the dictionary is obtained by forming a set of possible name words from one or more terms that are used in names of a plurality of geographic entities in the geographic database.

3. The computer-implemented method of claim 2, wherein the plurality of geographic entities from which the set of possible name words is obtained comprises a plurality of geographic entities of a particular type.

4. The computer-implemented method of claim 1, wherein the dictionary is a conventional electronic dictionary.

5. The computer-implemented method of claim 1, wherein the dictionary is obtained from a corpus of documents.

6. The computer-implemented method of claim 1, further comprising:
    using the validated name synonym rule to generate a synonym name for the second geographic entity, wherein the synonym name for the second geographic entity corresponds to the original name of the first geographic entity.

7. The computer-implemented method of claim 1, wherein the original names are associated with corresponding different natural languages, the method further comprising:
    identifying a first set of the original names of the geographic entities that are associated with a first one of the corresponding natural languages and a second set of the original names of the geographic entities that are associated with a second one of the corresponding natural languages; and
    performing the forming, retaining, determining, and associating steps separately for the first set and for the second set.

8. A non-transitory computer-readable storage medium having executable computer program instructions embodied therein that when executed by a computer processor cause the computer processor to perform actions comprising:

identifying a first geographic entity in a geographic database having an original name that includes a plurality of terms;

forming a name synonym rule by associating a sequence of adjacent terms in the original name of the first geographic entity with a single-word concatenation of the sequence of adjacent terms;

validating the name synonym rule by matching the single-word concatenation with a word in a dictionary;

using the single-word concatenation as a synonym name for the first geographic entity;

receiving a geographic query comprising a name;

determining that the name is the synonym name for the first geographic entity and that the name is an original name for a second geographic entity in the geographic database; and providing a result set comprising the first geographic entity and the second geographic entity, wherein the second geographic entity is ranked higher than the first geographic entity.

9. The computer-readable storage medium of claim 8, wherein the dictionary is obtained by forming a set of possible name words from one or more terms that are used in names of a plurality of geographic entities in the geographic database.

10. The computer-readable storage medium of claim 8, wherein the plurality of geographic entities from which the set of possible name words is obtained comprises a plurality of geographic entities of a particular type.

11. The computer-readable storage medium of claim 8, wherein the dictionary is a conventional electronic dictionary.

12. The computer-readable storage medium of claim 8, wherein the dictionary is obtained from a corpus of documents.

13. The computer-readable storage medium of claim 8, the actions further comprising:

using the validated name synonym rule to generate a synonym name for the second geographic entity, wherein the synonym name for the second geographic entity corresponds to the original name of the first geographic entity.

14. The computer-readable storage medium of claim 8, wherein the original names are associated with corresponding different natural languages, the actions further comprising:

identifying a first set of the original names of the geographic entities that are associated with a first one of the corresponding natural languages and a second set of the original names of the geographic entities that are associated with a second one of the corresponding natural languages; and performing the forming, retaining, determining, and associating steps separately for the first set and for the second set.

15. A computer system, comprising:

a computer processor; and a non-transitory computer-readable medium storing a computer program executable by the computer processor, the computer program when executed by the computer processor causing the computer processor to perform actions comprising:

identifying a first geographic entity in a geographic database having an original name that includes a plurality of terms;

forming a name synonym rule by associating a sequence of adjacent terms in the original name of the first geographic entity with a single-word concatenation of the sequence of adjacent terms;

validating the name synonym rule by matching the single-word concatenation with a word in a dictionary;

using the single-word concatenation as a synonym name for the first geographic entity;

receiving a geographic query comprising a name;

determining that the name is the synonym name for the first geographic entity and that the name is an original name for a second geographic entity in the geographic database.

16. The computer system of claim 15, wherein the dictionary is obtained by forming a set of possible name words from one or more terms that are used in names of a plurality of geographic entities in the geographic database.

17. The computer system of claim 15, wherein the plurality of geographic entities from which the set of possible name words is obtained comprises a plurality of geographic entities of a particular type.

18. The computer system of claim 15, wherein the dictionary is a conventional electronic dictionary.

19. The computer system of claim 15, wherein the dictionary is obtained from a corpus of documents.

20. The computer system of claim 15, the actions further comprising:

using the validated name synonym rule to generate a synonym name for the second geographic entity, wherein the synonym name for the second geographic entity corresponds to the original name of the first geographic entity.

21. The computer system of claim 15, wherein the original names are associated with corresponding different natural languages, the actions further comprising:

identifying a first set of the original names of the geographic entities that are associated with a first one of the corresponding natural languages and a second set of the original names of the geographic entities that are associated with a second one of the corresponding natural languages; and performing the forming, retaining, determining, and associating steps separately for the first set and for the second set.

* * * * *